United States Patent Office 3,449,200
Patented June 10, 1969

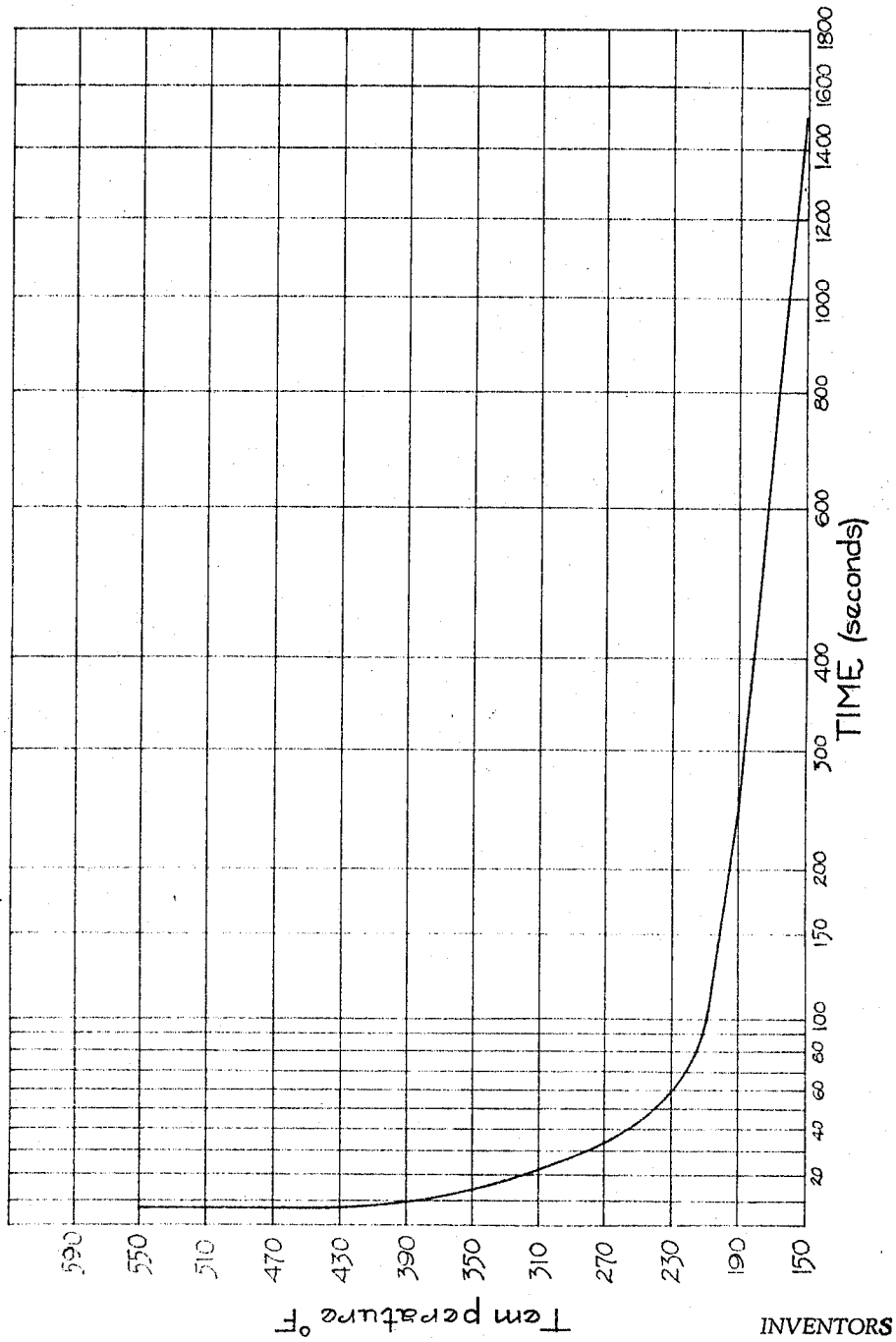

3,449,200
PRODUCT AND METHOD OF PRODUCING COMPOSITE POLYESTER TEXTILE RUBBER PRODUCTS
Edward F. Kalafus, Akron, and Richard M. Wise, Uniontown, Ohio, assignors to The General Tire & Rubber Company, a corporation of Ohio
Filed Oct. 5, 1965, Ser. No. 493,118
Int. Cl. B32b 25/08; C09j 3/14, 5/02
U.S. Cl. 161—92                                         13 Claims

ABSTRACT OF THE DISCLOSURE

Polyester textiles give improved adhesion to vulcanized rubber compounds using conventional elastomer/aldehyde resin adhesives when the textile is first coated with a polymer such as polyethylenimine containing a preponderance of

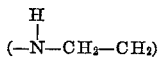

groups and is then conditioned in an inert gas environment containing elemental oxygen at a temperature of 180° F. or more for a period of time sufficient to increase the adhesion at least 50% compared to the adhesion obtained when the coated textile has not been so heat conditioned.

---

As used in the description and claims of the invention following, the term "polyester textile" or "polyester textile material" refers to any filament, fiber, thread, yarn, cord, cable, woven fabric, nonwoven fabric, knit fabric or the like, fabricated in whole or part from a synthetic, high-molecular-weight polymer in which the major portion by weight has been derived from the condensation of a polybasic acid and a polyhydric alcohol which has a high degree of modulus and tensile strength and imparts to manufactured rubber articles in which it is incorporated, form and structure and/or a high degree of strength, toughness and durability. The polyester polymers normally employed in textiles are derived from the condensation of an aromatic acid, usually a phthalic acid or a low molecular weight diester thereof, and a low molecular weight glycol, such as ethylene glycol or 1,4-dimethylol cyclohexane. A particularly preferred polyester textile is polyethylene terephthalate because of the many desirable properties it imparts to textiles such as high modulus and tensile strength, high melting point, resistance to flexing, dimensional stability and resistance to degradation and loss of properties upon exposure to environmental conditions of use.

Because of this array of attributes, the rubber industry has sought to employ polyester textiles and particularly the textiles based on polyethylene terephthalate in manufacturing textile-reinforced rubber products, especially those products requiring high performance such as pneumatic tires and power transmission and conveyor belts which depend to a great extent on the reinforcement of the textile to attain the high degree of strength and durability required of such products. Unfortunately, this effort has been impeded by the difficulty of obtaining by simple and direct manufacturing processes, uniform and reproducible high bond strengths between the rubber compound and the reinforcing polyester textile in the finished rubber article.

For instance, when a polyester textile was treated with an aqueous, rubber-latex/resorcinol-formaldehyde type adhesive such as described in United States Patents 2,128,229 and 2,561,215 and widely employed for adhering nylon and rayon textiles to rubber, it was found that the adhesion between the polyester textile and rubber was inadequate for most rubber products. To alleviate this adhesion deficiency, two-coat adhesive systems were devised which employed a pretreatment of the polyester textile with a solution of a polyisocyanate material in an organic solvent. This pretreatment, though improving adhesion to a moderate extent, has not been widely embraced because of the hazards attendant the use of organic solvents, the inherent toxicity of the polyisocyanates and the poor stability of the dip and the treated cord due to their reactivity with atmospheric moisture. To circumvent these problems, the use of aqueous dispersions of blocked isocyanates as a component in either a pretreatment dip or a one-step, latex-resin dip has been suggested. This expedient, although imparting a generally acceptable level of adhesion, is unattractive to the rubber manufacturer because of the added cost of the blocked isocyanate, the expense and difficulty experienced in making stable aqueous dispersions, and the propensity for the dispersion to settle during factory operations giving rise to variability in material pickup and consequently in bond strengths between textile and rubber.

Another type of pretreatment suggested by the prior art utilizes polyepoxide compounds and an epoxy curing agent. This approach was found wanting in that it imparted only mediocre adhesion and required extensive curing times and/or temperatures before application of the final adhesive composition.

Similarly, a recently developed one-step dip employing the reaction product of triallyl cyanurate, resorcinol and formaldehyde incorporated into a conventional-type latex/phenol-resin adhesive composition required that the dipped textile be exposed to very high temperature for extended periods of time. The conditions required are not considered feasible for conventional manufacturing operations and in addition cause degradation of the textile.

Another recently disclosed process (British Patent 962,174) teaches that improved adhesion of rubber compositions to polyethylene terephthalate yarns, cords and fabrics can be obtained by treating the textile with an aqueous solution of polyethylenimine, drying the textile and subsequently treating the textile with a latex dispersion of a copolymer of a vinyl pyridine and a diene in an aqueous solution of a phenolaldehyde resin pre-condensate and finally drying the textile while under tension at a temperature of at least 100° C. When a polyethylene terephthalate textile was treated, dried, and dipped in accordance with the teachings of this reference, there was obtained only marginal improvement in adhesion of textile to rubber. It was considered that though the level of adhesion obtained using the technology disclosed in the reference would be acceptable for some polyester textile-reinforced rubber products, it would not generally be adequate for the manufacture of the high performance rubber products such as pneumatic tires and power transmission belting which require an adhesion strength approaching the tensile strength of the textile itself in order to obtain the strength and durability required of these products.

Surprisingly, it has been discovered in the manufacture of composite polyester textile-rubber products that a polyester textile which has been provided with a polymer coating containing

groups and

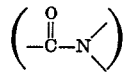

groups and subjected to an elevated temperature treatment can be simply, reliably and tenaciously bonded to a vulcanizable rubber composition using conventional elastomeric polymer/aldehyde resin-type adhesives.

The polymer containing the

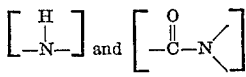

groups which is used to treat a polyester textile in accordance with this invention is the oxidation product of a polymer which contains groups of the general formula

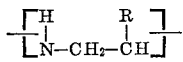

wherein R is a methyl or ethyl radical or hydrogen. The oxidation of the polymer containing

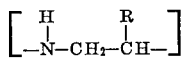

groups to form the

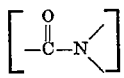

groups may be accomplished either prior to or after, or both prior to and after, the application of the polymer to the polyester textile. Because the polymer is simply and readily oxidized forming

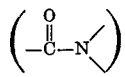

groups in an inert gas environment containing elemental oxygen during the heat treatment of the polymer-coated polyester textile, this process of providing a polymer coating having

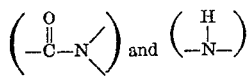

groups constitutes the preferred embodiment of the invention and will be the method primarily described and illustrated in the following specification. By inert gas environment is meant one that contains no elements or compounds other than elemental oxygen that can substantially react with or physically change the coated polyester textile to an extent that its subsequent adhesion and/or physical properties would be appreciably impaired when combined with the rubber compound.

The preferred polymer which contains

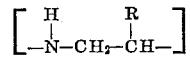

groups used in this invention is the polymerization product of ethylenimine, 1,2-propylenimine or 1,2-butylenimine. The polymer may be a homopolymer or a copolymer of any one or combinations of these alkylenimines. Polymers and copolymers of this description will for the purpose of simplicity in nomenclature be referred to as an "alkylenimine polymer" or "polyalkylenimine" in the description and claims of this invention. Because of the ready availability and lower cost it is preferred to employ either homopolymers of ethylenimine or copolymers containing a major portion of ethylenimine.

The minimum and maximum molecular weight of the alkylenimine polymer which can be used is not narrowly critical and is only limited by practical considerations such as availability and the high solution viscosities observed when molecular weight is exceedingly high. Normally the polyalkylenimines which can be employed in coating the polyester textile have molecular weights ranging from about 500 to about 150,000. Because of the somewhat higher order of adhesion observed and the low solution viscosity, alkylenimine polymers having molecular weights ranging from 500 to 10,000, though, are preferred.

In coating the polyester textile in accordance with this invention, the alkylenimine polymer is most easily and hence preferably applied as a dilute solution of polymer in solvent. The preferred solvent is water, but organic polar solvents such as methanol, ethanol, dioxane and acetone can be used either alone or in combination with themselves, other miscible organic solvents, or water. Maximum adhesion is usually obtained employing solutions containing 0.50 to 1.50 percent polymer though significant improvements in adhesion are obtained with coating solutions containing as little as 0.10 percent alkylenimine polymer. Polymer solutions containing higher total solids, such as 3 to 4 percent, may be, but are not normally, utilized because no commensurate advantage is realized for the higher coating weights deposited on the textile.

When 0.5 to 1.5 percent solutions of alkylenimine polymers are used, a polyester textile in the form of a 1260/2 denier tire cord shows about a 0.20 to 0.70 percent polymer pickup and constitutes the generally preferred range. Pickups as low as about 0.02 percent, though, demonstrate appreciable adhesion improvement when low solids coatings such as 0.1 to 0.2 percent are used. Maximum polymer pickup will generally not exceed about 1.5 percent on a tire cord textile.

The alkylenimine polymer solution may be applied to the polyester textile by any of the methods known to the art such as dipping, brushing, spraying, roller coating, and so forth. Complete coverage of the textile is insured when the textile is dipped in the polymer solution and hence is the procedure of choice. The dwell time of the textile in the solution is not critical so long as it is sufficient to allow complete coverage of the textile with polymer. Generally in factory operations, dwell times ranging from 0.25 to 5 seconds can be utilized. After the coating operation, excess solution is removed from the textile likewise by conventional procedures such as by passing between squeeze rollers, by blowing with air, by vibrating or shaking, and so forth.

After application of the alkylenimine polymer solution, the solvent or mixture of solvents, which, as previously pointed out, will preferably be water or mixtures containing a major portion of water, is substantially removed from the textile, before the application of the elastomeric polymer aldehyde resin adhesive. This is most expeditiously accomplished by placing the textile into a vented oven which circulates heated air around and through the textile to accelerate the evaporation of solvent. Depending on a number of variables such as the mass of the textile, the thickness of the polyalkylenimine coating, the nature of the solvent employed, and the velocity of the circulating air, the solvent is substantially removed from the coating within time periods ranging from about five seconds at 400 to 500° F. to about 30 seconds or more at temperatures of 200° F. or less.

Following solvent removal, the polyester textile is subjected to an elevated temperature treatment. When the polymer coating contains few, if any,

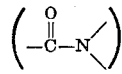

groups, the elevated temperature treatment should be conducted in an inert gas environment containing elemental oxygen to allow the concurrent formation of the

groups. Most advantageously, to give maximum manufacturing efficiency, this elevated temperature treatment of the coated textile will be conducted concurrently with the drying step as an integrated one-step operation. When integrated with the drying step, the heat treatment step will be most advantageously conducted at least for the initial part of the time interval, in a vented oven having circulating air to facilitate solvent removal from the coated textile. Alternatively, the heat treatment operation can be accomplished by exposing the textile to infrared radiation such as obtained with "Calrod" heaters or by contacting it with heated surfaces such as by passing it around one or more heated metal rolls. In any event, irrespective of the heating means employed, the polyester textile coated with the alkylenimine polymer is conditioned at an elevated temperature for at least a length of time sufficient to increase the adhesion between textile and rubber by at least 50 percent compared to the adhesion obtained when the alkylenimine polymer-coated polyester textile is only dried. By "dried" is meant that virtually all of the solvent present in the alkylenimine polymer solution applied to the polyester textile has been removed by a conditioning treatment such as centrifuging or evaporation, and the coated polyester textile approaches an essentially constant weight. FIGURE 1 shows the plot of the minimum time of heat treatment in a circulating hot air oven at various temperatures which is required of a polyethylenimine coated polyester tire cord in order to attain this 50 percent increase in adhesion. From the graph it can be seen that at a temperature of about 230° F., which is about the minimum temperature which imparts appreciable increases in adhesion within reasonable treatment times, the coated textile must be heat treated for a minimum time of approximately 60 seconds. Where longer treatment times can be tolerated, the graph illustrates that lower temperatures can be utilized, such as 180 or 200° F. but require 480 seconds and 170 seconds of treatment, respectively, to increase adhesion 50 percent. The graph further illustrates that the time of treatment can be as short as ten seconds when temperatures of about 330° F. or higher are employed. It will be appreciated that the minimum times at various temperatures of heat treatment required to attain a 50 percent increase in adhesion as illustrated in the FIGURE 1 graph can only serve as a general guide as to the order of time necessary. Such factors as the bulk and form of the textile, alkylenimine coating thickness and solvents, and the type and efficiency of the heating means could affect these minimum required heat treatment times.

Generally, it is preferred that the maximum temperature employed in heat treating the polyalkyenimine-coated polyester textile not appreciably exceed the melting point of the textile polymer to minimize the danger of textile degradation which in the case of polyethylene terephthalate textiles is about 480–500° F. Though the maximum time of treatment is not narrowly critical at the intermediate temperatures of treatment, that is in the range of 230 to 400° F., it has been observed that both degradation of textile and adhesion occur at higher temperatures when the time of treatment exceeds about 60 seconds in the 400–440° F. range and 30 seconds at temperatures approaching the melting point of the textile (470–500° F.). Consequently, the time of treatment should be carefully controlled at these higher temperatures. A similar effect is also noted at lower temperatures such as 180 to 220° F. but at longer time intervals of around 15 to 30 minutes before degradation becomes pronounced.

Generally, the maximum levels of adhesion have been obtained when the coated polyester textile has been treated at temperatures and times ranging from 280° F. for 60 to 180 seconds up to about 470° F. for 10 to 30 seconds and hence these constitute the preferred range of conditions.

The preceding description of the minimum, maximum and preferred conditions for temperature and time in the heat treatment of a polyester textile coated with an alkylenimine polymer is generally applicable whether the heat treatment step is integrated with and includes the drying step or is a separate independent operation conducted on the textile at some period of time subsequent to the coating and drying step.

The coated polyester textile may be heat treated, either relaxed or tensioned. Normally, in factory operations, it will be under only moderate tension sufficient to keep it taut in passing, usually in a continuous fashion, through the coating application, drying, and heat treating operations. When, as hereinafter discussed, it is desired to heat stretch the polyester textile, this may be partially or completely accomplished during the heat treating operation. Usually, though, all or the major portion of heat stretching will be accomplished after coating with the elastomeric polymer/aldehyde resin adhesive.

Alternatively, the polyester textile, according to another embodiment of the invention, may be coated with an alkylenimine polymer which contains a significant quantity of

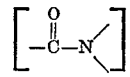

groups. Polymers of this description may be easily synthesized by oxidizing an alkylenimine polymer under controlled conditions of time and temperature using elemental oxygen—preferably air or oxygen-containing compounds such as an aqueous solution of hydrogen peroxide. This oxidation should be carefully conducted so as to prevent excessive polymer crosslinking which hinders the ability to dissolve and apply the polymer from solution, and/or polymer degradation which diminishes the ability of the precoating to promote adhesion between the polyester textile and the rubber composition.

In still another embodiment of the invention, the alkylenimine polymer may be oxidized both prior to and after application to the polyester textile. In both these alternate embodiments of the invention, the time and temperature conditions required to heat treat the coated polyester textile prior to application of the adhesive composition are essentially the same as those utilized for a polyester textile coated with a polymer which contains few if any

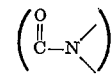

groups. Further, when either a partially or sufficiently oxidized alkylenimine polymer is utilized, the same considerations as to composition, molecular weight, method of application and so forth enumerated for the non-oxidized alkylenimine polymer are generally applicable.

Generally, it has been observed that satisfactory adhesion is attained with coatings of alkylenimine polymers which have been oxidized to an extent such that they contain

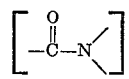

groups in a quantity sufficient such that the infrared absorbance value of the

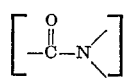

group divided by the absorbance value of the

group gives a value of at least 0.5. Maximum adhesions are obtained when the ratio of these two infrared absorbance values is about 2.0 or greater. As aforedescribed, the alkylenimine polymer is preferably oxidized during the heat treatment of the coated polyester textile because as a practical matter this operation will usually be performed in the presence of air and sufficient

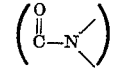

groups will be formed to effect the improved adhesion of this invention.

In addition to the alkylenimine polymers, there can be utilized in this invention lower-molecular-weight polyethylene polyamines, such as diethylene triamine, triethylene tetramine, and tetraethylene pentamine. Because of their volatility at elevated temperatures, the lower-molecular-weight polyethylene polyamines when used in this invention may be modified by reaction with organic compounds containing two or more groups, such as epoxy, carboxyl, acid chloride, and isocyanate groups, reactive with the amino groups to increase their molecular weight and lower their volatility. Examples of compounds which can be used to achieve this increase in molecular weight are butadiene diepoxide, the diglycidyl ether of ethylene glycol, succinic acid, maleic anhydride, succinyl dichloride, and hexamethylene diisocyanate. When used, such compounds are employed in only a minor quantity compared to the polyethylene polyamine so as to leave a major portion of the amino groups unreacted. Generally 1.0 to 1.5 equivalents of the amino-group-reactive compound per mole of the polyethylene polyamine are sufficient. When a polyethylene polyamine, either unmodified or modified, is used to treat a polyester textile, the same general considerations apply as aforedescribed for the use of either a non-oxidized, partially oxidized, or sufficiently oxidized alkylenimine polymer.

After being provided with a polymer coating containing

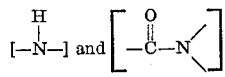

groups and the heat treatment, the polyester textile is coated with a generally conventional elastomeric polymer/aldehyde resin type adhesive composition normally dispersed in an essentially aqueous medium. The elastomeric polymer utilized may be natural rubber or any synthetic polymer which either alone or in combination with natural rubber or a second synthetic polymer forms, when deposited on a substrate from an aqueous dispersion and dried, an essentially integral film exhibiting flexibility and/or rubber-like properties. Representative of synthetic polymers which can be utilized are: polymers and copolymers of conjugated dienes such as butadiene, isoprene, 2-chlorobutadiene, 2,3-dimethyl-butadiene, piperylene and 2-fluorobutadiene prepared by homopolymerization of the diene and copolymerization of the dienes with other conjugated dienes and/or one or more other copolymerizable ethylencially unsaturated compounds such as styrene, vinyl toluene, alpha-methyl styrene, divinyl benzene, acrylonitrile, methyl methacrylate, methacrylic acid, vinyl pyridine, methyl isopropenyl ketone and the like; polymers derived from the copolymerization of isobutylene with a minor quantity of a conjugated diene, either unmodified or modified, such as the halogenated derivatives thereof; polymers derived from the copolymerization of ethylene and propylene either alone or with copolymerizable diethylenically unsaturated compounds; chloro-sulfonyl polyethylene; and acrylate ester copolymers containing a major portion of an acrylate ester such as ethyl acrylate and butyl acrylate. Examples of synthetic polymers of the above description which can be used, together with the A.S.T.M. recommended family designation in parentheses, are butadiene rubbers (BR), synthetic isoprene rubbers (IR), chloroprene rubbers (CR), isobutylene-isoprene rubbers (IIR), nitrile-butadiene rubbers (NBR), styrene-butadiene rubbers (SBR), pyridine-butadiene rubbers (PBR), saturated (EPM) and unsaturated (EPDM) ethylene-propylene rubbers, and ethylacrylate/2-chloroethyl vinyl ether rubbers (ACM). Since in the adhesive composition the elastomeric polymer is usually dispersed in an essentially aqueous medium, it is most advantageously synthesized by a free-radical emulsion technique to give a latex whenever the polymer lends itself to that type of synthesis. When the polymer is produced in bulk or solution, using either a free-radical or ionic-type polymerization, it is best homogeneously dispersed in water before formulation into the adhesive using emulsifying agents and water-soluble colloids to impart disperson stability. Any organic solvents employed in the preparation of the polymer will normally be substantially removed to minimize fire hazards in factory operations.

To attain maximum adhesion, the elastomeric polymer or mixture of polymers employed in the adhesive composition should normally be chosen so as to be compatible with the vulcanizable rubber composition with which the adhesive coated polyester textile is to be combined in forming the manufactured rubber product. By this is meant that the chemical and physical nature and properties of the adhesive elastomeric polymer(s) should be similar to those of the polymer(s) employed in the rubber composition to a degree that they have either an inherent affinity for each other or are capable of chemically bonding to each other through the vulcanizing mechanism employed to cure the rubber compound. Thus, when the vulcanizable rubber composition consists predominantly of an intralinearly unsaturated rubber(s) such as natural rubber or synthetic rubbers such as BR and SBR rubbers derived from the polymerization or copolymerization of a conjugated diolefin, then there should be utilized in the adhesive, elastomeric polymers likewise having a high degree of unsaturation. Conversely, a rubber composition containing a major portion of a highly saturated rubber(s) such as the butyl (IIR) and the ethylene-propylene (EPM or EPDM) rubbers can be most effectively bonded to the textile utilizing adhesive compositions containing a similar type of highly saturated polymer. When the rubber compositions contain a major portion of rubber which have polar groups such as the nitrile group or which have been derived from a vinyl monomer such as ethyl acrylate or vinyl ethyl ether, maximum adhesion values are usually attained when the adhesive contains a major portion of a like polymer. Further adhesion is promoted when the polymers utilized in the rubber composition and the adhesive are chosen on the basis of similarity of vulcanization characteristics by which is meant that the adhesive polymer is vulcanizable by the vulcanizing agents employed in the rubber compositions under the curing conditions uitlized in the manufacture of the rubber article.

To further illustrate this inter-relationship, it has been observed that vulcanizable rubber compounds containing as the principal rubbers intralinearly unsaturated polymers such as natural, butadiene and styrene-butadiene rubbers are most tenaciously adhered to a polyalkylenimine precoated polyester textile, which has been subjected to an elevated temperature environment according to the process of this invention, when there is used adhesive compositions containing a major proportion of an elastomeric polymer or copolymer containing a conjugated diene (which is preferably butadiene, isoprene or chloroprene because of their low cost and ease of polymerization) in a weight proportion of at least 33 percent and more preferably about 40 percent. Particularly outstanding results have been achieved utilizing copolymers containing at least 50 weight percent of a conjugated diene preferably butadiene or isoprene and at least 5 or more weight percent of a vinyl pyridine monomer such as are described in United States Patent 2,561,215. Butyl rubber (IIR) and ethylene-propylene rubber (EPM and EPDM) compounds on the other hand have been found to be most effectively bonded to the textile using adhesive compositions containing a similar polymer either unmodified or chemically modified as the major component.

Although the elastomeric polymer is customarily employed in the unvulcanized state, it is possible when desired to vulcanize the rubber usually in the latex form prior to or after combining with the aldehyde resin in formulating the adhesive composition.

The aldehyde resin component employed in the adhesive composition is the reaction product of an aldehyde and an organic compound which forms on heating an intermediate, fusible, resin-like material which forms on further heating an essentially infusible and insoluble resin.

To enhance the adhesion at elevated temperatures, it is desirable to use an aldehyde resin which condenses to this essentially infusible, insoluble state during the temperature history, i.e., time and temperature, to which the adhesive is subjected in manufacturing the rubber article. Generally it is preferred in formulating and making up the adhesive composition to employ resins or their reactant precursors which are soluble to at least a limited extent in water to facilitate the preparation and utilization of the resin in the preferred essentially aqueous medium.

Representative of organic compounds which can condense with aldehyde to form resinous materials having these characteristics are phenols, amines, amides, ketones, and aromatic hydrocarbons.

Examples of phenols which may be used and which may be either mono- or polynuclear, monohydric or polyhydric are phenol, m-cresol, 3,5-xylenol, 1,5-di-hydroxynaphthalene, Bisphenol-A, and resorcinol. Phenols which have only two reactive sites such as 3,4-xylenol, 2,3,5-trimethyl phenol, p-tertiary butyl phenol, and hydroquinone can be used but only when combined with compounds having three or more sites reactive with an aldehyde such as the above enumerated phenols.

Examples of amine and amide compounds which may be used are urea, thiourea, ethylene urea dicyandiamide, aniline, and melamine.

Examples of ketone compounds that may be used are acetone, methyl ethyl ketone, dibutyl ketone and cyclohexanone.

Examples of aromatic hydrocarbons that may be used are toluene and naphthalene.

The aldehydes employed in forming the resin condensation product can be, for example, formaldehyde, acetaldehyde, benzaldehyde, glyoxal, or furfural. Because of the low cost and the ease and speed of reaction, formaldehyde and formaldehyde-generating materials such as paraformaldehyde and hexamethylene-tetramine are preferred, and consequently will generally be utilized as the major or sole aldehyde in forming the aldehyde resin. To insure thermosetting properties a molar excess of the aldehyde in comparison with the resin-forming organic compound should be employed. Generally it is desirable to use about 1.5 mole or more of aldehyde, preferably formaldehyde, per mole of the organic compound.

The aldehyde resin component is normally utilized by forming the intermediate, fusible resinous product separately before combining with the elastomeric polymer. As mentioned previously, it is preferable to utilize aldehyde resins which are at least limitedly soluble in water to facilitate make-up and use of the adhesive. When the resin is insoluble or only partially soluble, it is best if the resin is first homogeneously dispersed in water prior to mixing with the elastomeric polymer latext.

In the adhesive compositions employed in the practice of this invention there may be used single aldehyde-resin compounds, mixed aldehyde-resin compounds formed from one or more of the resin-forming organic compounds and one or more aldehydes, or mixtures of different aldehyde resin compounds.

In formulating the adhesive compositions, satisfactory adhesion results are obtained utilizing a wide range of ratios of the aldehyde resin to the elastomeric polymer. Generally it is found that adhesives containing the aldehyde resin to the elastomeric polymer in weight ratios of about 1:20 to 2:1 give adequate adhesion, with the prefered weight ratio for optimum results ranging from about 1:10 to 1:2.

Although polyester textiles provided with a polymer coating containing

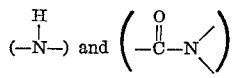

groups and heat treated according to the teachings of this invention give, when adhered to vulcanizable rubber compositions with adhesive compositions containing an elastomeric polymer and aldehyde resin as the principal components, outstanding adhesion, it has been discovered that even superior adhesion can be obtained when there is incorporated in the adhesion composition minor amounts of an epoxy compound. Epoxy compounds which impart this improved adhesion have an epoxide equivalent weight of 1000 or less and are either a liquid or a solid which is fusible at elevated temperatures.

Representative of epoxide compounds which can be added to the adhesive composition are epoxidized unsaturated compounds such as vinyl cyclohexene dioxide, 2,3,5,6-diepoxyoctane, epoxidized glycerol trioleate, and epoxidized polybutadiene; epoxy ethers such as are obtained by reacting epichlorohydrin or dichlorohydrin with a mono or polyhydric alcohol in the presence of an acid-acting compound, and subsequently treating the resulting product with an alkaline material; and the glycidyl ether condensation products of mono or polyhydric phenol compounds obtained by the reaction of epichlorohydrin with phenols in an alkaline medium. Representative examples of the epoxy ether compounds are mono glycidyl ether of butanol, the diglycidyl ether of ethylene glycol, the diglycidyl ether of diethylene glycol, and the triglycidyl ether of glycerol. The glycidyl ethers of mono or polyhydric pehnols are exemplified by such products as the glycidyl ether of phenol, and the diglycidyl ether condensation products of resorcinol, catechol, hydroquinone, Bisphenol-A, and 1,5-dihydroxy naphthalene. Generally any epoxy compound as previously characterized may be utilized. It may be monomeric or polymeric; saturated or unsaturated; aliphatic, cycloaliphatic, aromatic, or heterocyclic; and may optionally be substituted with various substituents such as halogen atoms, hydroxyl groups, ether radicals, and the like. Most advantageously, to facilitate dispersion in the essentially aqueous medium preferred for the adhesive composition, there are employed epoxy compounds which are soluble or easily dispersible in water. Examples of such water soluble or dispersible epoxide materials are the diglycidyl ether of ethylene glycol, the diglycidyl ether of diethylene glycol, the diglycidyl ether of propylene glycol, and the triglycidyl ether of glycerol. Examples of these and other water soluble epoxides, as well as epoxide materials generally which can be employed in the adhesive compositions are well documented in the prior art, as, for instance, United States Patents 2,913,356 and 2,902,398.

While even as little as one part of an epoxy compound per 100 parts of the combined, elastomeric-polymer and aldehyde-resin imparts some improvement, it is generally necessary to use about five or more parts to attain consistently higher levels of adhesion. Generally, the maximum level of epoxide compound modification will not exceed about 50 parts, although in some cases as much as 100 parts may be used. While an epoxy compound having an epoxide equivalent weight no greater than 1000 imparts improved adhesion, better results are obtained when the epoxy compound has an epoxy equivalent weight of 500 or less and most preferably an equivalent weight not exceeding 200. Further, it has been observed that better results are obtained when the epoxy compound contains at least two epoxy groups per molecule. As previously pointed out, it is most desirable if the epoxy compound is either water soluble or water dispersible to facilitate its predispersion in water prior to its incorporation into the preferred essentially aqueous-dispersed adhesive composition. When the epoxy compound is not sufficiently water soluble or dispersible to allow this, it is best if it is homogeneously predispersed in water utilizing emulsifying and dispersing agents prior to incorporating it into the adhesive composition. Although the epoxy compounds have normally been incorporated into the adhesive composition as the final ingredient after the mixing of the elastomeric polymer and the aldehyde resin components, the order of addition is not critical and it can be added at any time in the adhesive composition makeup, so long as all the components are admixed within a short time interval.

The total solids of the adhesive composition is not narrowly critical, so long as it is sufficiently high to insure adequate adhesive coverage of the textile under the coating conditions employed. Normally a total solids of at least about 10 percent is required to accomplish this under usual factory coating operations. Generally the highest levels of adhesion are obtained when the total solids of the adhesive composition is about 15 to 25 percent. High total solids such as 30 percent and above may be advantageous in certain rubber goods but generally are undesirable as they can lead to adhesive-coated textiles which are excessively stiffened with consequent impairment of dynamic flexing properties.

The adhesive compositions are preferably dispersed in an essentially 100 percent aqueous medium to minimize the toxicity, combustibility, and cost attendant the use of organic solvent compounds. When organic solvents are employed in conjunction with water as the adhesive dispersing medium, it is preferred to use those solvents, such as ethyl alcohol, acetone, and tetrahydrofuran, which are at least partially miscible with water. Adhesion compositions dispersed in a major portion of organic diluents likewise can be utilized to coat the polyester textile pretreated in accordance with this invention to give rubber-textile composite articles having excellent adhesion and durability, but generally are not the adhesive systems of choice because of the disadvantages associated with the use of organic solvents in factory operations.

In addition to the aldehyde-resin, elastomeric-polymer, and epoxy compound components, there may optionally be incorporated into the adhesive composition other ingredients such as catalysts to promote thermosetting of the aldehyde resin, fillers, rubber-vulcanizing agents and accelerators, anti-degradents, surface active agents, and other types of naturally occurring or synthetic resinous materials for the purpose of imparting special handling, stability, curing or finishing properties to the adhesive composition.

When an epoxy compound is utilized in the adhesive composition, the use of additional compounding ingredients which tend to react with and/or crosslink the epoxy compound is desirably avoided. Thus, it has been observed that amines particularly are deleterious to adhesive compositions containing epoxide compounds because of their known propensity to readily either react with or catalyze the reaction of epoxy compounds. For instance, it has been observed that an aqueous-dispersed, adhesive composition of a resorcinol-formaldehyde resin/butadiene-vinyl pyridine polymer containing approximately 10 percent by weight of the triglycidyl ether of glycerol readily gels within a few hours when appreciable amounts of amines or ammonium hydroxide are incorporated therein. Other compounds having a deleterious effect on an adhesive composition containing an epoxide compound might be organic and inorganic acids which can either react with or catalyze the epoxy-ring-opening reactions, causing the polymerization of the epoxy compound. Hence, when such compounds might be required, for example, to catalyze the aldehyde resin condensation, they should be employed only in small quantities or be added just prior to the time when the adhesive is to be used.

The polyester textile may be coated with the adhesive composition by any conventional procedure known to the art such as by dipping, roller coating, or spraying. Simple dipping of the textile into the adhesive composition followed by removal of excess adhesive by any suitable means such as squeeze rollers or blowing air is the method normally used in manufacturing operations. The time of immersion should be sufficient to insure complete adhesive coverage of the textile and will generally be at least about 0.25 second. The textile may be either tensioned or in a relaxed condition during the coating step.

After the application of the adhesive to the textile, the dispersing medium, which is usually water, is removed by drying the coated textile. This is most effectively accomplished by passing the textile through a vented oven which circulates heated air through and around the textile. Alternatively, the textile may be dried by exposure to infrared radiation or contact with heated metal drums. Although the time and temperature of drying is not especially critical, it should be sufficient to convert the aldehyde resin to a condition such that the resin is no longer readily soluble, is solid in the cold state, but still capable of softening under the influence of additional heat. In many cases, the aldehyde resin will be condensed even further to a condition wherein it is insoluble and infusible to minimize the chance of the coated textile sticking either to the equipment on which it has been dried or to itself when rolled up for storage prior to being combined with the vulcanizable rubber compound. For the faster reacting aldehyde resins, this advanced state of resinification is accomplished when the adhesive-coated textile is subjected to drying conditions as low as 225° F. for 30 to 60 seconds. For slower reacting resins, this advanced stage of resinification may require in the neighborhood of 30 seconds drying at 300° F. or higher. Generally the optimum times and temperatures for drying the adhesive-coated, polyester textile can be ascertained by simple experimentation to minimize adhesive tackiness and determine suitability for factory operations. With adhesive systems based on the widely used resorcinol formaldehyde resin/butadiene copolymer latex it has been observed that higher adhesions are obtained when the polyester textile is dried at tempertaures of about 300° F. and above for times in excess of 15 or 20 seconds, and consequently are the preferred minimum conditions for drying polyester textiles coated with adhesives of this type.

For many applications, it is desirable to heat set or stretch the polyester textile prior to incorporating it into the rubber article in order to minimize textile stretching and obtain a textile-reinforced, rubber product having maximum dimensional stability and durability in service. This is usually most expeditiously accomplished by heat stretching the textile concurrently with the adhesive drying operation. With the preferred polyethylene terphthalate type of polyester textile, there is normally employed a stretching time of about 20 to 60 seconds at temperatures ranging from 380° to 480° F.

The percentage of dried adhesive deposited on any polyester textile to give adequate adhesions is dependent upon a number of independent variables such as the form and mass of the polyester textile; that is, whether it is a cord, yarn, woven fabric or non-woven fabric, and on the composition and total solids of the particular adhesive employed. Generally, utilizing an aqueous adhesive composition having a total solids of about 10 percent, about the minimum required for high orders of adhesion, there is obtained on a 1260/2 polyester tire cord type fabric a 2 percent pickup of adhesive. Generally, adhesive pickups much below 1.5 percent are inferior in adhesion results, while pickups above about 8 percent will generally not be employed as being uneconomical and conferring no commensurate advantage upon the coated textile, and may in fact, impart rigidity and inflexibility and thus adversely affect the dynamic properties of the textile in the finished rubber article.

After the polyester textile has been coated with the adhesive composition and dried, it is combined or associated with a vulcanizable rubber composition and subjected to vulcanizing conditions to cure the rubber composition and develop adhesion between textile and rubber. The vulcanizable rubber composition may be any natural rubber or synthetic rubber-containing composition. The principal natural rubber employed will be of the Hevea type, although it is possible to employ caoutchouc, guayule, guttapercha and the like. The synthetic rubbers employed may be any of the synthetic polymers previously enumerated in connection with the elastomeric polymer used in the adhesive composition and include, for example, butadiene rubbers (BR), synthetic isoprene rubbers (IR), chloroprene rubbers (CP), isobutylene-isoprene rubbers (IIR), nitrile-butadiene rubbers (NBR), styrene-butadiene rubbers (SBR), pyridine-butadiene rubbers (PBR), saturated (EPM) and unsaturated (EPDM) ethylene-propylene rubbers, and ethyl acrylate-2-chloro ethyl vinyl ether rubbers (ACM). Generally, as pointed out in connection with the selection of the elastomeric polymer employed in the adhesive composition, the rubber utilized in the vulcanizable composition should be chosen so as to be compatible with the elastomeric polymer of the adhesive composition. As this has previously been extensively discussed, it will not be herein further discussed except to state that the same considerations apply to the selection of the rubbers employed in the vulcanizable rubber composition. The synthetic rubbers employed may be synthesized by any known polymerization procedure using either free radical, ionic, or the newer stereospecific polymerization systems, and may be made by bulk, solution or emulsion techniques.

The vulcanizable rubber compositions contain a vulcanizing agent and usually one or more vulcanizing accelerators. Normally, for unsaturated polymers there is employed as vulcanizing agents sulfur or sulfur-bearing compounds such as tetramethylthiuram disulfide, selenium diethyl-dithiocarbamate and dipentamethylene thiuram tetrasulfide, and as vulcanizing accelerators, compounds such as benzothiazyl disulfide, N-oxydiethylene benzothiazole-2-sulfenamide, 2-mercaptobenzothiazole, tellurium diethyl-dithiocarbamate, and tetramethylthiuram disulfide. An alternate vulcanizing system for unsaturated rubbers utilizes a peroxide-type vulcanizing agent such as dicumyl or benzoyl peroxide. With halogen-substituted polymers, there is often employed polyvalent metal oxide or hydroxide compounds, either alone or in combination with amine cocuratives. All of these vulcanization systems are by way of example and are not meant to be limiting. Other vulcanization systems well known in the art may be used and are encompassed within the scope of this invention. In addition, the vulcanizable rubber compositions will usually contain other compounding ingredients such as anti-degradants, fillers, reinforcing pigments, and colorants. The choice of these other compounding ingredients and the preparation of the vulcanizable rubber compounds is well known in the art, and hence needs no further elaboration.

The combining of the vulcanizable rubber composition with the adhesive-coated polyester textile is normally accomplished in the majority of rubber products by calendering the rubber composition directly onto the textile as, for example, in the production of pneumatic tires, conveyor belts and inflated rubber products. In the production of power transmission belting, the rubber compound is often combined with the reinforcing textile by extruding the rubber compound in the desired configuration directly onto the textile reinforcement. In the production of rubber articles such as hose, the textile is braided directly onto a preformed rubber tubing, which has subsequently applied to it a further rubber coating over the textile reinforcement. Here again, the method of combining the polyester textile and the rubber composition is not particularly critical and is capable of being accomplished by any of the multitude of methods conventionally employed in the rubber manufacturing industry.

After the adhesive-coated polyester textile and vulcanizable rubber composition have been combined, the assembled product is vulcanized while maintaining an intimate association of textile and rubber usually by means of heat and pressure. Normally, there is employed for the vulcanization of most rubber compounds, temperatures and times ranging from at least about 250° F. for periods of about 30 minutes or more, up to curing temperatures of 400° F. and above for very short curing times such as 2 to 10 minutes. The vulcanization is normally accomplished under pressure sufficient to shape the final rubber article and/or to minimize the danger of textile-rubber separation during vulcanization. It is, though, within the scope of this application to vulcanize the rubber compositions in association with the polyester textile at or near room temperature, either with or without pressure. Such systems would normally require more extensive curing times such as on the order of hours or even days, and would also necessitate the utilization of an aldehyde resin component in the adhesive composition which either has been reacted to an essentially infusible, insoluble state prior to combining with the rubber composition or is capable of reacting to this state under the nearly ambient temperatures employed to vulcanize the rubber composition.

In the preceding description, as well as the following examples, all parts and percentages are by weight unless otherwise specified.

The invention is further illustrated by the following examples. Because the major area of industrial application of polyester textile reinforcement of rubber is in the area of pneumatic tires, the examples utilize a polyester textile in the form of a twisted cord, which is the primary form of textile utilized in reinforcing pneumatic tires. Although in normal factory operations these cords are combined into a loosely woven fabric web employing a relatively few weak transverse woof threads, the cords in the following examples were processed and tested as single individual cords. The tire cords were derived from two plies of a high-molecular weight polyethylene terephthalate, 1260-denier yarn twisted 10 turns per inch which had been twisted 10 turns per inch. Similarly, the majority of the examples utilize vulcanizable Rubber Compounds A and B given below which are like those used in the construction of pneumatic tires and contain as the major rubber component intralinearly highly unsaturated rubbers.

Rubber Compound A

| Ingredient: | Parts by weight |
| --- | --- |
| Smoked sheet | 50 |
| SBR–1502 | 50 |
| Endor (plasticizer) | 0.5 |
| HAF carbon black | 35 |
| Zinc oxide | 3 |
| Stearic acid | 1 |
| Picco 100 (tackifier) | 2 |
| Agerite spar (antioxidant) | 1 |
| Circosol 2XH oil (plasticizer) | 7 |
| Ridacto (vulcanization activator) | 0.5 |
| NOBS #1 (vulcanization accelerator) | 0.9 |
| Crystalline sulfur | 3.25 |

Rubber Compound B

| Ingredient: | Parts by weight |
| --- | --- |
| Smoked sheet | 50 |
| SBR–1500 | 50 |
| FEF carbon black | 40 |
| Zinc oxide | 5 |
| Stearic acid | 2 |
| BLE (antioxidant) | 2 |
| Philrich oil | 7 |
| Altax (accelerator) | 1.5 |
| Sulfur | 2 |

The tire cords which were treated according to the teachings of the invention were coated with homopolymers of ethylenimine of varying molecular weights. The polyethylenimine contained no detectable quantity of

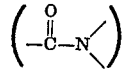

groups. In all examples which employ the improved process of the invention the

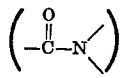

groups were formed by the subsequent oxidation of the polymer after application to the tire cord utilizing various heat treating conditions as specified.

The tire cords were bonded to Rubber Compounds A and B with Adhesive Compositions C and D.

Adhesive Composition C

An adhesive composition was prepared by admixing 327 grams of an aqueous solution of a preformed resorcinol formaldehyde resin [1] (6.7% TS) and 244 grams of 41% TS "Gen-Tac" [2] latex to give a final composition of approximately 21% total solids. The adhesive composition was allowed to age at least 16 hours at ambient temperatures before use and was always used within 24 hours after mixing.

Adhesive Composition D

Another adhesive composition was prepared by admixing two parts by weight of Epon 812 [3] with 100 parts by weight of Adhesive Composition C which had been aged 16 hours after combining the RF resin and the Gen-Tac latex. This epoxy-modified adhesive was used within one to eight hours after make-up.

The polyethylenimine coating and the adhesive composition were applied by separate passes of a single continuous tire cord through a bath of the material, thence through soft rubber squeeze rolls to remove excess material, thence through a circulating hot air oven, and finally through a cooling zone at ambient temperatures (25–30° C.) before winding up on a storage spool. In applying the polyethylenimine coating only sufficient tension to maintain the cord in a taut condition was used in the dipping, drying-heat treating, and cooling steps. In applying the adhesive, the cord was immersed in the adhesive composition with just sufficient tension to maintain tautness but was stretched 4% in the subsequent drying-heat setting and cooling steps. The dwell time of the cord in both the bath of the polyethylenimine solution and the bath of the aqueous dispersion of the adhesive composition ranged from 1 to 10 seconds depending upon the speed of the cord which was varied in the examples to control the length of time the cord remained in the circulating hot air oven.

After the application of both the polyethylenimine and the adhesive composition, the tire cord was stored in an essentially anhydrous atmosphere. The static adhesion of the cord to the vulcanizable rubber composition was determined by ASTM Test Method D–2138–62T commonly referred to as the "H-Pull Test," modified in that the cords were imbedded in rubber strips ⅜ inch wide and ¼ inch thick which were unsupported by any fabric. The H-Test specimens were cured in a preheated mold 20 minutes at 305° F. and cooled at least four hours at 73.4% ±5° F. prior to testing.

The preceding description of the method of applying the polyethylenimine and the adhesive composition to the tire cord and the subsequent testing in the H-Pull Test will be referred to as the "standard" procedure in the examples.

EXAMPLE I

This example illustrates the unexpected and vast increase in adhesion which is obtained by treating a polyester textile according to the method of this invention as compared to the method disclosed in the prior art, particularly, British Patent 962,174.

Tire Cords A and B were immersed in a 0.75% aqueous solution of polyethylenimine (1000 molecular weight) dried and heat treated 60 seconds at 280° F. using the standard procedure.

Utilizing the teachings of the example given in British Patent 962,174, Tire Cord C was immersed in a 1.5% aqueous solution of pollyethylenimine (30,000 molecular weight) for 10 minutes at room temperature, centrifuged for 30 minutes to remove excess polyelthylenimine solution, and dried overnight for 18 hours at ambient temperatures (approximately 76° F.).

Tire Cords A and C plus a control Tire Cord D having no polyethylenimine coating, were then coated with Adhesive Composition C while Tire Cord B was coated with Adhesive Composition D employing the standard procedure in which all four cords were dried and heat set for 60 seconds at 428° F. All four adhesive-coated cords were then combined with Rubber Compounds A and B, cured, and tested.

From the results of these tests shown in Table 1, it is apparent that Tire Cords A and B which were coated with polyethylenimine and heat treated in accordance with the teachings of this invention, exhibit an almost fourfold increase in adhesion to Rubber Compound A, and a twofold increase in adhesion to Rubber Compound B, as compared with the adhesion obtained with the control Tire Cord D, having no polyethylenimine coating. By comparison, Tire Cord C treated in accordance with the teachings of the prior art, while showing an increase in adhesion to Compound A, does not have sufficient adhesion to make it suitable for high performance rubber products, such as pneumatic tires and power transmission belting.

The comparison of the adhesion of Tire Cords A and B against the adhesion of Tire Cord C, reveals that the method of this invention imparts adhesion which is approximately 2½ times greater in both Rubber Compound A and B. This vastly increased adhesion was completely unexpected. As a matter of fact, based on the teachings of British Patent 962,174, it would have been expected that heating a polyethylenimine-coated polyester textile at higher temperatures would be deleterious, as the patent states that it is desirable that the polyethylenimine-precoated cord be dried at temperatures below 100° C.

TABLE 1

| Tire Cord Sample | Heat Treatment Condition of Polyethylenimine Coating | Adhesive | Average H-Pull Adhesion (Pounds) | |
|---|---|---|---|---|
| | | | Rubber Compound A | Rubber Compound B |
| A | 60 seconds at 280° F | Adhesive Composition C | 30.0 | 44.3 |
| B | do | Adhesive Composition D | 32.0 | [1] 49.3 |
| C | Dried 18 hours at Ambient Temperatures | Adhesive Composition C | 12.8 | 17.7 |
| D | Control, No Polyethylenimine Coating | do | 6.2 | 20.0 |

[1] H-Pull Specimen failure was due to tire cord breaking in seven out of ten specimens pulled.

---

[1] The preformed resorcinol formaldehyde resin aqueous solution was prepared by stirring for six hours at 25° C., 41 grams of resorcinol and 60.4 grams of a 37% formaldehyde solution in 835 milliliters of water and 21.5 milliliters of a 1.0 N sodium hydroxide solution abbreviated "RF" resin.

[2] "Gen-Tac" Latex—General Tire's trademark for a terpolymer latex of 70 parts butadiene, 15 parts styrene and 15 parts 2-vinyl pyridine.

[3] Epon 812—Shell Chemical trademark for triglycidyl ether of glycerol.

The results in Table 1 further illustrate the even higher order of adhesion, which is attained when the adhesive composition contains an epoxy compound. Thus, though Tire Cord A when adhered to rubber Compound B gives an extremely high average adhesion of 44.3 lbs., a figure approaching the breaking strength of the tire cord, Tire Cord B gives adhesion to the same compound, which exceeds the tensile strength of the tire cord in a significant number of the H-Pull test specimens.

EXAMPLE II

This example illustrates the conditions of time and temperature at which a polyethylenimine-coated tire cord must be heat treated according to the teachings of this invention if it is to exhibit excellent adhesion to a vulcanizable rubber compound. A series of tire cords was passed through a 0.75% aqueous solution of polyethylenimine (about 1,000 molecular weight), and then into a circulating hot air oven for varying periods of time and at varying temperatures, as shown in Table 2 using the standard procedure. After cooling, Adhesive Composition D was applied by the standard procedure and the tire cords were dried and heat set for 40 seconds at 428° F. and combined with Rubber Compound A.

An examination of the H-Pull adhesions obtained given in Table 2 shows that at the low temperature of 180° F. even a 90-second heating period is insufficient to impart the improved results of this invention. At a temperature of 230° F. no significant increase in adhesion appears until the cord has been heated for about 60 seconds while at a temperature of 280° F. times as low as approximately 30 seconds impart an appreciable increase in adhesion. At a temperature of 330° F. the minimum time required to attain a meaningful increase in adhesion appears to be at some time interval between 15 and 30 seconds. Also noteworthy at this heat treating temperature is the decrease in adhesion which occurs when the polyethylenimine-coated cord is subjected to prolonged heating, such as 120 seconds. The adhesion results at 380° F. show that as little as 10 seconds heating imparts a tremendous increase in adhesion, and that after 30 seconds conditioning, the cord more than doubles its adhesion, as compared to cords which were only conditioned for five seconds in the oven. At 380° F. the data also reveals that times much in excess of 60 seconds can be deleterious to adhesion. The data further show that the polyethylenimine-precoated cord heat treated at a temperature of 430° F. attains maximum adhesion within 15 seconds, with degradation of adhesion setting in at some time prior to 30 seconds. At 470° F. the results indicate that five seconds heating time is still insufficient, but that some time interval between five and ten seconds is sufficient to impart the improved adhesion characteristic of this invention.

TABLE 2.—(RUBBER COMPOUND A)

| Temperature of Heat Treatment of Polyethylenimine Coated Tire Cord (° F.) | H-Pull Adhesion (Pounds) | | | | | | |
|---|---|---|---|---|---|---|---|
| | Time of Heat Treatment (Seconds) | | | | | | |
| | 5 | 10 | 15 | 30 | 60 | 90 | 120 |
| 180 | | | | 16.4 | 20.3 | 18.8 | |
| 230 | | | 16.7 | 21.9 | 24.2 | 25.6 | 26.8 |
| 280 | | | | 24.1 | 31.1 | 30.8 | 30.8 |
| 330 | 15.1 | | 21.0 | 29.0 | 39.5 | 38.8 | 24.1 |
| 380 | 17.5 | 32.2 | 31.1 | 38.1 | 37.1 | 33.3 | 18.1 |
| 430 | 16.5 | | 38.5 | 33.6 | 31.8 | 27.4 | 18.3 |
| 470 | 16.2 | 36.6 | 38.1 | 31.6 | | | |

EXAMPLE III

This example is identical to Example II and further illustrates the time and temperature of treatment which is required for a polyethylenimine-precoated polyester textile according to the teachings of this invention if good adhesion is to be obtained. It differs from Example II only in the use of Rubber Compound B, which utilizes a vulcanizing system based on lower sulfur and a benzothiazyl disulfide accelerator.

Examination of the H-Pull adhesion data given in Table 3 reveals that generally the same magnitude of temperature and time is required for the heat treatment of the polyethylenimine-coated tire cord to achieve the desired increase in adhesion to Compound B. Also, it appears that Compound B is capable of giving a higher order of adhesion to a tire cord treated in accordance with the method of this invention imparting in many H-Pull test specimens adhesion so great that the cord is broken, rather than failing due to loss of adhesion between rubber stock and cord as was observed in all the H-Pull specimens made with Compound A.

The data also seem to indicate that H-Pull adhesions obtained with Compound B are not as liable to degradation on prolonged heating of the polyethylenimine-coated cord. This increased stability may be illusory because so many of the H-Pull adhesions with Compound B exceed the tensile breaking strength of the cord, masking the decrease in adhesion which may be occurring on prolonged heating.

Specifically, the adhesion data with Compound B indicates that the ultimate adhesion as represented by cord breaks can be attained at temperatures as low as 280° F. when the cord is heated for a time of 120 seconds, while at higher intermediate temperatures, such as 330° F. only 60 seconds is required, and that when temperatures of 380° F. or above are utilized, times as short as 15 seconds or even less impart to the polyethylenimine-coated tire cord the ultimate attainable adhesion as reflected in the large number of cord breaks which are obtained.

TABLE 3.—RUBBER COMPOUND B

| Temperature of Heat Treatment of Polyethylenimine Coated Tire Cord (° F.) | H-Pull Adhesion (Pounds)[1] | | | | | | |
|---|---|---|---|---|---|---|---|
| | Time of Heat Treatment (Seconds) | | | | | | |
| | 5 | 10 | 15 | 30 | 60 | 90 | 120 |
| 180 | | | | | 21.0 | 24.4 | 25.8 |
| 230 | | | 24.3 | 31.2 | 34.4 | 36.6 | 39.5 |
| 280 | | | | | 34.0 | 49.2 | 45.5 | 45.9(2) |
| 330 | 21.6 | | 27.5 | 40.8 | 48.3(6) | 48.7(10) | 46.6(2) |
| 380 | 21.3 | 49.8(6) | 43.8(1) | 48.4(8) | 47.7(8) | 46.4(2) | 40.1 |
| 430 | 21.7 | | 48.5(6) | 45.7(3) | 40.3 | 38.0 | 36.5 |
| 470 | 19.4 | 48.6(6) | 48.0(3) | 44.5(2) | | | |

[1] The number in the parentheses is the number of cord breaks which occurred in the testing of ten H-Pull test specimens.

EXAMPLE IV

This example illustrates that the heat treatment of a polyalkylenimine-coated polyester textile may be conducted subsequent to the time when the textile has been coated with the polyalkylenimine solution and dried to secure the improved adhesion of this invention.

A tire cord was coated with a 0.75% aqueous solution of polyethylenimine (1,000 molecular weight) and dried 15 seconds at 230° F. by the standard procedure. After being stored one day at ambient temperatures (74–48° F.) part of the cord was passed through the circulating hot air oven for 60 seconds at 330° F. and cooled. Both the dried and the heat-treated cords were then coated with Adhesive Composition D and H-Pull adhesions determined in Rubber Compounds A an B.

The cord which had been essentially only dried by the 15 seconds at 230° F. conditioning gave only 16.7 and 24.3 pounds adhesion in Rubber Compounds A and B respectively as compared to 32.2 and 38.6 pounds adhesion obtained on the section of cord which had been subsequently heat treated. These results demonstrate that it is not necessary to conduct the heat treatment of a polyalkylenimine-coated polyester textile simultaneously with the drying step to achieve the improved results of this invention.

EXAMPLE V

A series of 1260/2 polythylene terephthalate tire cords was immersed in aqueous solutions of polyethylenimine (1,000 molecular weight) varying in concentration from 0.25% to 1.75%, dried and heat treated for 60 seconds at 330° F., coated with Adhesive Composition C, dried and heat set for 40 seconds at 428° F. and tested in Rubber Compounds A and B using the standard procedure.

The H-Pull adhesion results given in Table 4 demonstrate that though the advantages of this invention are obtained with polyalkylenimine coating solutions containing as little as 0.25% polymer, maximum adhesion strengths require coating solutions of about 0.75% minimum polymer solids when applied by the dipping technique utilized in this example. Generally it appears that adhesion is not too sensitive to the concentration of the polyethylenimine coating solution in the 0.25 to 1.75% range, excellent results being attained at all concentrations within this range.

TABLE 4

| Concentration of Polyethylenimine (Weight Percent Polymer) | Percent Weight Increase of Precoated Tire Cord | Adhesion (Pounds)[1] | |
|---|---|---|---|
| | | Compound A | Compound B |
| Control (No polyethylenimine precoating) | | 16.2 | 21.5 |
| 0.25 | 0.06 | 28.3 | 42.5 |
| 0.50 | 0.22 | 30.4 | 45.9 |
| 0.75 | 0.31 | 30.3 | 47.1(3) |
| 1.00 | 0.42 | 33.0 | 47.5(1) |
| 1.25 | 0.54 | 30.4 | 43.3(2) |
| 1.50 | | 29.9 | 46.4(2) |
| 1.75 | | 27.2 | 43.3(1) |

[1] The number in the parentheses is the number of cord breaks which occurred in the testing of ten H-Pull Test Specimens.

EXAMPLE VI

The efficiency of other epoxy compounds is demonstrated in this example. Four tire cords which had been coated with a 0.75% aqueous solution of polyethylenimine (1,000 molecular weight) and dried and heat treated for 60 seconds at 330° F. by the standard procedure were coated with the four different epoxy-modified adhesive compositions described in Table 5, and dried and heat set 40 seconds at 428° F. by the standard procedure.

When tested in Rubber Compounds A and B, the results given in Table 6 were obtained which illustrate the efficiency of various epoxy compounds to promote excellent adhesion between textile and rubber compositions according to the improved process of this invention.

Table 5

Adhesive
designation: Composition and method of preparation
VI-A ____ Adhesive Composition D.
VI-B ____ Two parts of glycidol were stirred into 100 parts of adhesive Composition C which had been aged 16 hours.
VI-C ____ Two parts of dicyclopentadiene dioxide stirred into 100 parts of adhesive Composition C which had been aged 16 hours.
VI-D ____ Two parts of the diglycidyl ether of Bisphenol A dissolved in ten parts of benzene were added to 100 parts of adhesive Composition C which had been aged 16 hours, and homogeneously dispersed in a Waring Blendor.

TABLE 6

| Adhesive Composition | H-Pull Adhesion (Pounds)[1] | |
|---|---|---|
| | Compound A | Compound B |
| VI-A (Triglycidyl ether of glycerol) | 37.8 | 48.4(10) |
| VI-B (Glycidol) | 37.0 | 49.7(6) |
| VI-C (Dicyclopentadiene dioxide) | 37.4 | 49.4(7) |
| VI-D (Diglycidyl ether of Bis-phenol A) | 40.1 | 48.6(9) |

[1] The number in parentheses is the number of cord breaks occurring in the rest of ten H-Pull test specimens.

EXAMPLE VII

A stable adhesive composition was prepared by stirring into a freshly-prepared, essentially unreacted mixture of 11 grams of resorcinol, and 16.2 grams of a 37% aqueous solution of formaldehyde dissolved in 250 mls. of water and 15 mls. of a 1.0 N sodium hydroxide solution, first 250 grams of Gen-Tac Latex and then 91 grams of 1.1 N ammonium hydroxide and continuing stirring for an additional ten minutes. This adhesive was applied by the standard procedure (drying and heat setting 40 seconds at 428° F.) to (1) a tire cord which had been precoated with polyethylenimine and heat treated by the standard procedure (0.75% aqueous solution of polyethylenimine dried and heat treated 60 seconds at 330° F.) and (2) a control tire cord having no coating.

When tested for H-Pull adhesive the cord treated by the method of this invention gave average adhesions of 33.2 and 47.0 pounds in Rubber Compounds A and B respectively, while the control cord gave only 14.1 and 21.6 pounds adhesion, respectively.

It is believed that the resorcinol, formaldehyde, and ammonia in this example are present predominantly in the form of a stable, water-insoluble compound having repeating groups of the general formula:

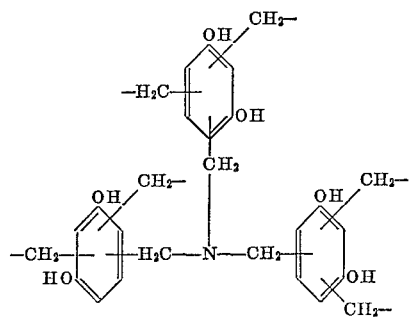

wherein the methylene radicals (—$CH_2$—) are connected to the resorcinol at the positions ortho and para to the OH groups. Other stable compounds based on other monohydric or dihydric phenols and employing amino compounds containing primary amine groups as partial or complete replacement for the resorcinol and ammonia could similarly be utilized. The compound, even though water insoluble, is generally well dispersed because of its formation in the presence of the latex which it is believed causes the compound to be either adsorbed on the latex particles or be dispersed by the surfactants in the latex. The resorcinol-formaldehyde resin precursor compound is unstable at elevated temperature, forming a resorcinol-formaldehyde resin during the subsequent drying, heat setting and vulcanization conditions to which the cord is subjected.

This experiment demonstrates that the aldehyde resin in the adhesive composition need not necessarily be in the partially condensed resinous state at the time of application of adhesive to textile to be operable in the process of this invention. The only requirement is that the aldehyde resin precursor reactants be capable of forming an essentially thermoset resin during the subsequent processing and fabricating conditions which are employed to produce the rubber article in which it is used to bond rubber to textile.

EXAMPLE VIII

A noncoated and polyethylenimine coated tire cord (0.75% aqueous solution of polyethylenimine, dried and heat treated sixty seconds at 330° F. by the standard procedure) were coated with the following described adhesive composition, dried and heat set sixty seconds at 428° F., and tested in the following described ethylene propylene rubber composition by the standard procedure (modified in the use of thirty-minute cure at 320° F.).

Adhesive composition

| Ingredient: | Parts by weight |
| --- | --- |
| ECD-586-50 latex [1] | 100 |
| Preformed resorcinol formaldehyde resin solution used in adhesive composition C except made with only one-half the quantity of 1.0 N sodium hydroxide solution | 60 |
| ZnO dispersion in water (60% T.S.) | 1.3 |

[1] ECD-586-50 Latex—aqueous dispersion of a chlorosulfonated polyolefin supplied by E. I. du Pont de Nemours and Company.

Ethylene propylene rubber composition

| Ingredient: | Parts by weight |
| --- | --- |
| Nordel 1040 [1] | 100 |
| Neoprene FB (polychloroprene vulcanizable plasticizer) | 5 |
| HAF black | 90 |
| Necton 60 (plasticizer) | 52.5 |
| ZnO | 5 |
| Stearic acid | 1 |
| MBT (accelerator) | 0.55 |
| Thionex (accelerator) | 1.5 |
| Sulfur | 1.88 |

[1] Nordel 1040—Du Pont trademark for their elastomeric ethylene, propylene, nonconjugated diene terpolymer of 40 Mooney viscosity (ML-4' at 250° F.).

The cord treated according to the method of this invention gave an average adhesion three times greater than the control cord with failure occurring principally between adhesive and rubber contrasted to the locus of failure in the control cord which appeared to be between cord and adhesive.

Characterization of the polymer coating on the polyester textile

The following experiment was conducted to elucidate the nature of and the change occurring to a polymer containing

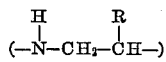

groups which has been applied to a polyester textile and heat treated according to the preferred embodiment of this invention.

Thin coatings of polyethylenimine were made by dissolving three parts of polyethylenimine (1,000 molecular weight) in 30 parts of water and 63 parts of acetone, spreading the solution (with a Number 40 wire-wound steel rod) onto a number of 0.001 inch thick polyethylene terephthalate films and onto a 0.003 inch thick polyethylene film (both films having been prewashed with acetone and dried) and drying at least ten minutes at ambient temperatures. The polyethylenimine coatings so produced were then heat treated in a circulating hot oven under the conditions of time and temperature shown in Table 7.

The infrared reflectance spectra of the polyethylenimine coatings so treated were obtained by using the Barnes Engineering MATR-3 unit equipped with a KRS-5 crystal (thallium bromide-iodide salt crystal) in conjunction with the Perkin Elmer Number 21 Spectrophotometer equipped with a sodium chloride prism run in a double beam mode using a standard resolution program (927 dial setting).

From the attenuated total reflectance (ATR) absorption spectra the absorbence "A" was determined by the base-line method of ASTM E-168-64T at the wave lengths of (1) 3.05μ, assigned to the amino

group, (2) 6.05μ, assigned to the amide carbonyl group

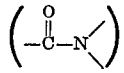

and (3) 11.5μ assigned to an unknown functional group in the substrate polyethylene terephthalate film used to give a semi-quantitative measure of the thickness of the polyethylenimine coating, the absorbence varying inversely with the coating thickness.

An examination of the absorbence data given in Table 7 indicates that the heat treating conditions utilized in the preferred embodiment of this invention to significantly increase the adhesion between the polyester textile and the rubber composition causes the formation of an appreciable number of

groups in the polymer coating. Simultaneously there is observed a decrease in the number of amino groups

present in the polymer coating. The presence and magnitude of these changes in the chemical composition of the polymer coating appears to be independent of the coating substrate, being about the same on both the polyethylene terephthalate and polyethylene film substrates.

These findings are interpreted to indicate that the heat treating conditions of time and temperature in an air environment employed in the practice of this invention oxidizes a significant number of the

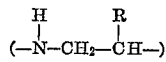

groups in the polymer coating, with

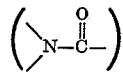

groups being one of the principal reaction products.

Although these findings do not conclusively establish that the presence of the

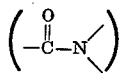

groups in the polymer coating is responsible for the improved adhesive strength obtained in the practice of this invention, it is concluded that the presence of a significant detectable quantity of such groups is characteristic of the polymer coatings which appreciably increase the adhesion between a polyester textile and a vulcanizable rubber composition within the scope of this invention.

Because of the apparent variations in coating thickness as reflected by the different absorbence values observed at 11.5 microns, a quantitative measure of the

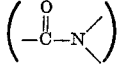

groups in the polymer coating independent of thickness was obtained by comparing the absorbence of the

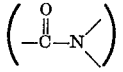

groups at 6.05μ to the absorbence of the amino

group at 3.05μ. A study of these

ratios which are independent of coating thickness reveals that the value increases with increasing severity of the heat treament and exhibits a good correlation with the adhesions obtained on coated polyester textiles subjected to equivalent conditions of time and temperature in the heat treatment operation. Based on these observations it is concluded that the polymer coating should contain sufficient

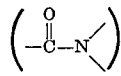

groups to give a $$\frac{A6.05\mu}{A3.05\mu}$$

ratio of at least 0.50 to obtain substantial improvements in adhesion and more desirably sufficient

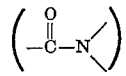

groups to give absorbence ratios having values from about 1 to 4 to secure the maximum benefits which can be obtained from the utilization of the improved process of this invention.

and heating of the coated polyester textile being done either separately or simultaneously in an integrated operation.

2. The method of claim 1 wherein the heating is carried out at a temperature of at least 230° F.

3. The improved method of claim 1 in which the polymer containing a preponderance of groups of the general formula $$(-\overset{H}{\underset{|}{N}}-CH_2-\overset{R}{\underset{|}{C}H}-)$$

is a copolymer of a major portion of ethylenimine and a minor portion of propylenimine, butylenimine, or mixtures thereof.

4. The improved method of claim 1 in which the polymer containing a preponderance of groups of the general formula $$(-\overset{H}{\underset{|}{N}}-CH_2-\overset{R}{\underset{|}{C}H}-)$$

TABLE 7

| Substrate Film | Heat Treatment Conditions | | A3.05u $\begin{pmatrix} H \\ | \\ -N- \end{pmatrix}$ | A6.05µ 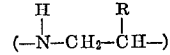 | A11.5µ 11 (Standard) | A6.05µ / A3.05µ |
|---|---|---|---|---|---|---|
| | Time (Sec.) | Temperature (° F.) | | | | |
| 0.001 inch polyethylene terephthalate | 90 | 180 | 0.140 | None | 0.360 | 0 |
| Do | 60 | 230 | 0.225 | 0.017 | 0.335 | 0.08 |
| Do | 30 | 280 | 0.194 | 0.070 | 0.310 | 0.38 |
| Do | 60 | 280 | 0.200 | 0.115 | 0.400 | 0.56 |
| Do | 10 | 330 | 0.214 | 0.033 | 0.455 | 0.18 |
| Do | 60 | 330 | 0.123 | 0.27 | 0.400 | 2.19 |
| 0.001 inch polyethylene terephthalate [1] | 60 | 330 | 0.804 | 0.303 | 0.250 | 3.69 |
| 0.001 inch polyethylene terephthalate | 60 | 470 | 0.070 | 0.140 | 0.367 | 2.01 |
| 0.003 inch polyethylene | 60 | 330 | 0.040 | 0.135 | None | 3.30 |

[1] Repeat experiment run at different time.

What is claimed is:

1. In the manufacture of a rubber product comprising a polyester textile and a vulcanizable rubber composition, the improved method of adhering the polyester textile to the vulcanizable rubber composition which comprises the following steps:
   (a) applying to the polyester textile a solution consisting essentially of a polymer containing a preponderance of groups of the general formula $$(-\overset{H}{\underset{|}{N}}-CH_2-\overset{R}{\underset{|}{C}H}-)$$

wherein R is selected from the class consisting of methyl and ethyl radicals and hydrogen, to produce a coated polyester textile,
   (b) drying the coated polyester textile to produce a dried, coated polyester textile,
   (c) heating the coated polyester textile at a temperature of at least 180° F. in an inert gas environment containing elemental oxygen to produce a heat-treated, dried, coated polyester textile,
   (d) applying to the heat-treated, dried, coated polyester textile an adhesive composition that adheres to the vulcanizable rubber composition after being vulcanized comprising an elastomeric polymer and an aldehyde resin to produce an adhesive-coated, heat-treated, dried, coated polyester textile,
   (e) combining the adhesive-coated, heat-treated, dried, coated polyester textile with the vulcanizable rubber composition to produce a composite rubber product and,
   (f) subjecting the composite rubber product to vulcanizing conditions sufficient to vulcanize the vulcanizable rubber composition and cause the polyester textile to adhere to the rubber composition;

the heating of the dried, coated polyester textile being of a duration sufficient to increase the adhesion of the polyester textile to the vulcanizable rubber composition by at least 50 percent over the adhesion obtained when the coated polyester textile is only dried, and the drying is polyethylenimine.

5. The improved method of claim 4 in which the aldehyde resin component of the adhesive composition consists essentially of phenol formaldehyde resins, precursor reactants of phenol formaldehyde resins or mixture thereof.

6. The improved method of claim 4 in which the aldehyde resin component of the adhesive composition consists essentially of a resorcinol-formaldehyde resin, precursor reactants of a resorcinal formaldehyde resin or mixtures thereof.

7. The improved method of claim 1 in which the polymer containing a preponderance of groups of the general formula $$(-\overset{H}{\underset{|}{N}}-CH_2-\overset{R}{\underset{|}{C}H}-)$$

is selected from the class consisting of polyethylene polyamines, reaction products of said polyethylene polyamines and compounds containing functional groups reactive with primary and secondary amino groups in which a major portion of the amino groups are unreacted, and mixtures thereof.

8. The improved method of claim 1 in which the adhesive composition contains an epoxy compound that is a liquid or a solid which is fusible at elevated temperatures and that has an epoxide equivalent weight of less than 1000.

9. The improved process of claim 1 in which the aldehyde resin of the adhesive composition is one which is capable of condensing to an essentially insoluble, infusible state during the time and temperature conditions to which the adhesive composition is subjected in manufacturing the rubber product.

10. The improved method of claim 2 in which the polymer containing a preponderance of groups of the general formula $$(-\overset{H}{\underset{|}{N}}-CH_2-\overset{R}{\underset{|}{C}H}-$$

is polyethylenimine, the adhesive composition consists essentially of an elastomeric polymer comprising at least 50 weight percent of butadiene, isoprene, or mixtures thereof and an aldehyde resin consisting essentially of a resorcinol formaldehyde resin, precursor reactants of a resorcinol formaldehyde resin or mixtures thereof, and the gas containing elemental oxygen is air.

11. A composite polyester textile-rubber product made by the method of claim 10.

12. A polyester textile that has a coating of a polymer containing

groups consisting essentially of polyethylenimine or a copolymer of a major portion by weight of ethylenimine and a minor portion of propylenimine, butylenimine or mixtures thereof and that has been heated in an inert gas environment containing elemental oxygen at a temperature of 230° F. or more for a period of time sufficient to generate in an identical coating applied to a 0.001 inch polyethylene terephthalate film and identically heated sufficient

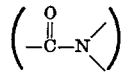

groups such that the infrared reflectance spectra of the coating exhibits a ratio of the infrared absorbance of the

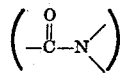

groups to the infrared absorbance of the

groups of at least 0.5.

13. The rubber product containing the coated polyester textile of claim 12.

References Cited

UNITED STATES PATENTS

| 2,828,237 | 3/1958 | Rosser | 161—247 X |
| 3,033,707 | 5/1962 | Lacey et al. | 171—76 |
| 3,305,430 | 2/1967 | Hennemann | 161—227 |

EARL M. BERGERT, *Primary Examiner.*

C. B. COSBY, *Assistant Examiner.*

U.S. Cl. X.R.

117—47, 80, 138.8, 161; 156—330, 331; 161—231, 241, 257; 260—75, 843

PO-1050
(5/69)

UNITED STATES PATENT OFFICE
CERTIFICATE OF CORRECTION

Patent No. 3,449,200        Dated June 10, 1969

Inventor(s) Edward F. Kalafus and Richard M. Wise

It is certified that error appears in the above-identified patent and that said Letters Patent are hereby corrected as shown below:

Column 2, line 7, insert ---fire--- between the words "the" and "hazards". Column 9, line 53, the word "latext" should be ---latex---. Column 10, line 4, the word "adhesion" should be ---adhesive---. Column 11, line 39, the word "finishing" should be ---finished---. Column 18, lines 56 and 57, the phrase "(74-48°F.)" should be ---(74-78°F.)---. Column 20, line 16, "adhesive" should be ---adhesion---. Column 22, line 65, the formula " H " should be --- H ---.
                          (HN-)                   (-N-)

In Table 7, the heading over the fifth column of numbers "A11.5µ11" should be ---A 11.5µ---; the third column of numbers, seventh number "0.804" should be ---0.084---; the last column of numbers, third number "0.38" should be ---0.36---; the last column of numbers, fourth number "0.56" should be ---0.58---; the last column of numbers, fifth number "0.18" should be ---0.15---; the last column of numbers, sixth number, "2.1ς" should be ---2.19---; the last column of numbers, seventh number "3.69" should be ---3.61---; the last column of numbers, eighth number "2.01" should be ---2.00---; the last column of numbers, ninth number, "3.30" should be ---3.38---.

SIGNED AND
SEALED
MAR 17 1970

(SEAL)
Attest:

Edward M. Fletcher, Jr.
Attesting Officer

WILLIAM E. SCHUYLER, JR.
Commissioner of Patents